(12) United States Patent
Li et al.

(10) Patent No.: US 12,200,676 B2
(45) Date of Patent: Jan. 14, 2025

(54) METHODS AND APPARATUSES FOR FLEXIBLE BANDWIDTH UTILISATION

(71) Applicant: Telefonaktiebolaget LM Ericsson (publ), Stockholm (SE)

(72) Inventors: Ming Li, Stockholm (SE); Bo Göransson, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 352 days.

(21) Appl. No.: 17/770,894

(22) PCT Filed: Oct. 23, 2019

(86) PCT No.: PCT/EP2019/078927
§ 371 (c)(1),
(2) Date: Apr. 21, 2022

(87) PCT Pub. No.: WO2021/078380
PCT Pub. Date: Apr. 29, 2021

(65) Prior Publication Data
US 2022/0386307 A1   Dec. 1, 2022

(51) Int. Cl.
*H04W 72/04*   (2023.01)
*H04W 28/02*   (2009.01)
*H04W 72/0453*   (2023.01)
*H04B 7/0413*   (2017.01)

(52) U.S. Cl.
CPC ... *H04W 72/0453* (2013.01); *H04W 28/0257* (2013.01); *H04B 7/0413* (2013.01)

(58) Field of Classification Search
CPC .......... H04W 72/0453; H04W 28/0257; H04B 7/0413
USPC ........................................................ 370/329
See application file for complete search history.

(56) References Cited

U.S. PATENT DOCUMENTS

| | | |
|---|---|---|
| 10,868,646 B1 * | 12/2020 | Pawar ..................... H04L 47/24 |
| 2008/0119197 A1 | 5/2008 | Skarby |
| 2013/0044650 A1 * | 2/2013 | Barker ................. H04B 7/0671 |
| | | 455/562.1 |

* cited by examiner

*Primary Examiner* — Gbemileke J Onamuti
(74) *Attorney, Agent, or Firm* — COATS & BENNETT, PLLC

(57) ABSTRACT

Embodiments described herein relate to methods and apparatuses for configuring communication between a base station and at least one wireless device, the base station using an antenna array, wherein antenna ports in the antenna array are coupled to radio frequency branches. The method comprises determining a first radio frequency bandwidth for a first radio frequency branch based on one or more factors associated with traffic served by a plurality of radio frequency bandwidth parts, and configuring the first radio frequency branch to serve frequencies within the first radio frequency bandwidth.

24 Claims, 11 Drawing Sheets

Determine a first radio frequency bandwidth for a first radio frequency branch based on one or more factors associated with traffic served by a plurality of radio frequency bandwidth parts ─201

Configure the first radio frequency branch to serve frequencies within the first radio frequency bandwidth ─202

METHODS AND APPARATUSES FOR FLEXIBLE BANDWIDTH UTILISATION

TECHNICAL FIELD

Embodiments disclosed herein relate to methods and apparatuses for providing flexible bandwidth utilization.

BACKGROUND

Massive Multiple Input Multiple Output (MIMO) utilises a large number of service antennas that are operated fully coherently and adaptively. Extra antennas help by focusing the transmission and reception of signal energy into ever-smaller regions of space. The use of a large number of antennas results in better throughput and energy efficiency, in particular when combined with simultaneous scheduling of a large number of user terminals (or wireless devices). Massive MIMO was originally envisioned for time division duplex (TDD) operation but may potentially be applied in frequency division duplex (FDD) operation.

Other benefits of massive MIMO include the extensive use of inexpensive low-power components, reduced latency, simplification of the media access control (MAC) layer, and robustness to interference and intentional jamming. The anticipated throughput may depend on the propagation environment providing asymptotically orthogonal channels to the wireless devices, and experiments have so far not disclosed any limitations in this regard.

The bandwidth of each radio frequency branch is typically limited by the components used. In the transmitter, the RF components such as power amplifier (PA), low noise amplifiers (LNA), and filters are chosen to support a typical bandwidth. Increasing the bandwidth served by each radio frequency branch may therefore mean that more expensive components must be used. Furthermore, algorithms for processing the transmitted or received signals may have to be more complex when the bandwidth is increased and may therefore require higher processing power.

As used herein, the term radio frequency bandwidth (RFBW) may refer to the bandwidth served by each radio frequency (RF) branch of the AAS product. For example, each RF branch (or path) may be served by an antenna port coupled to one or more antennas. In legacy systems, each RF branch may support the same RFBW. However, in some examples, a total bandwidth may be served by the entire AAS, where different RF branches in the AAS serve different RFBWs. In this case, logically for whole AAS, a total bandwidth is served collectively by all of the radio frequency branches. The concept of the total bandwidth is illustrated in FIG. 1.

In FIG. 1, the RF branch W serves the RFBW 101. The RF branch Z also serves the RFBW 101. However, the RF branches Y and X both serve a different RFBW 102. The entire AAS comprising the branches W, Z, Y and X therefore serves a total bandwidth 103. In this example, the RFBW 101 comprises two carrier bandwidths and the RFBW 102 comprises two different carrier bandwidths.

By providing a total bandwidth as illustrated in FIG. 1, the AAS has a larger transmitting and receiving bandwidth capability, but as each RF branch serves only a single or multiple carriers (rather than partial carriers), each RF branch may operate with limited configurations. For example, the RF branch utilizing different RFBWs in one total bandwidth operates as two separated cells; or, cooperation between RF branches which utilize different RFBWs in one total bandwidth may only be through intra-carrier aggregation (as split mode).

For a typical example, there may be 64 RF branches each assigned a RFBW, where the same RFBW may be assigned to half of the RF branches, and a different RFBW may be assigned to the other half of the RF branches. In this case, 32 of the RF branches may be assigned a first RFBW spanning a first 100 MHz, and the other 32 of the RF branches may be assigned a second RFBW spanning the next 100 MHz giving a total bandwidth of 200 MHz.

In this case therefore, each carrier or subcarrier (bandwidth part) may be received or transmitted by 32 antenna branches. Reducing the number of RF branches transmitting or receiving each carrier from 64 (the highest number of RF branches that could potentially be used) to 32 may, in principle, generate following impacts for all carriers or subcarriers:

A fixed reduction in the total transmitting/receiving power
A fixed reduction in the diversity gain from multiple RF branches
A fixed reduction in the freedom of spatial processing, which may cause a relatively large performance degradation, for example for interference limited cases (for example an NLOS channel environment)
Less resource waste for different traffic loads
Less energy waste as power allocation is based on per carrier & per branch The allocation of the RFBWs to the different RF branches is fixed or determined when the carriers are setup. A main allocation principle is to ensure each carrier/subcarrier is equally served by same number of RF paths.

SUMMARY

According to the embodiments described herein there is provided a method for configuring communication between a base station and at least one wireless device, the base station using an antenna array, wherein antenna ports in the antenna array are coupled to radio frequency branches. The method comprises determining a first radio frequency bandwidth for a first radio frequency branch based on one or more factors associated with traffic served by a plurality of radio frequency bandwidth parts; and configuring the first radio frequency branch to serve frequencies within the first radio frequency bandwidth.

According to some embodiments there is provided a scheduler for configuring communication between a base station and at least one wireless device, the base station using an antenna array, wherein antenna ports in the antenna array are coupled to radio frequency branches; the scheduler comprising processing circuitry and a memory, said memory containing instructions executable by said processing circuitry whereby said scheduler is configured to: determine a first radio frequency bandwidth for a first radio frequency branch based on one or more factors associated with traffic served by a plurality of radio frequency bandwidth parts, and configure the first radio frequency branch to serve frequencies within the first radio frequency bandwidth.

Further, a computer program and a computer program product for carrying out the above method when the computer program is executed on a processor are also disclosed.

BRIEF DESCRIPTION OF THE DRAWINGS

For a better understanding of the embodiments of the present disclosure, and to show how it may be put into effect, reference will now be made, by way of example only, to the accompanying drawings, in which.

DESCRIPTION

Figures 1, 2:
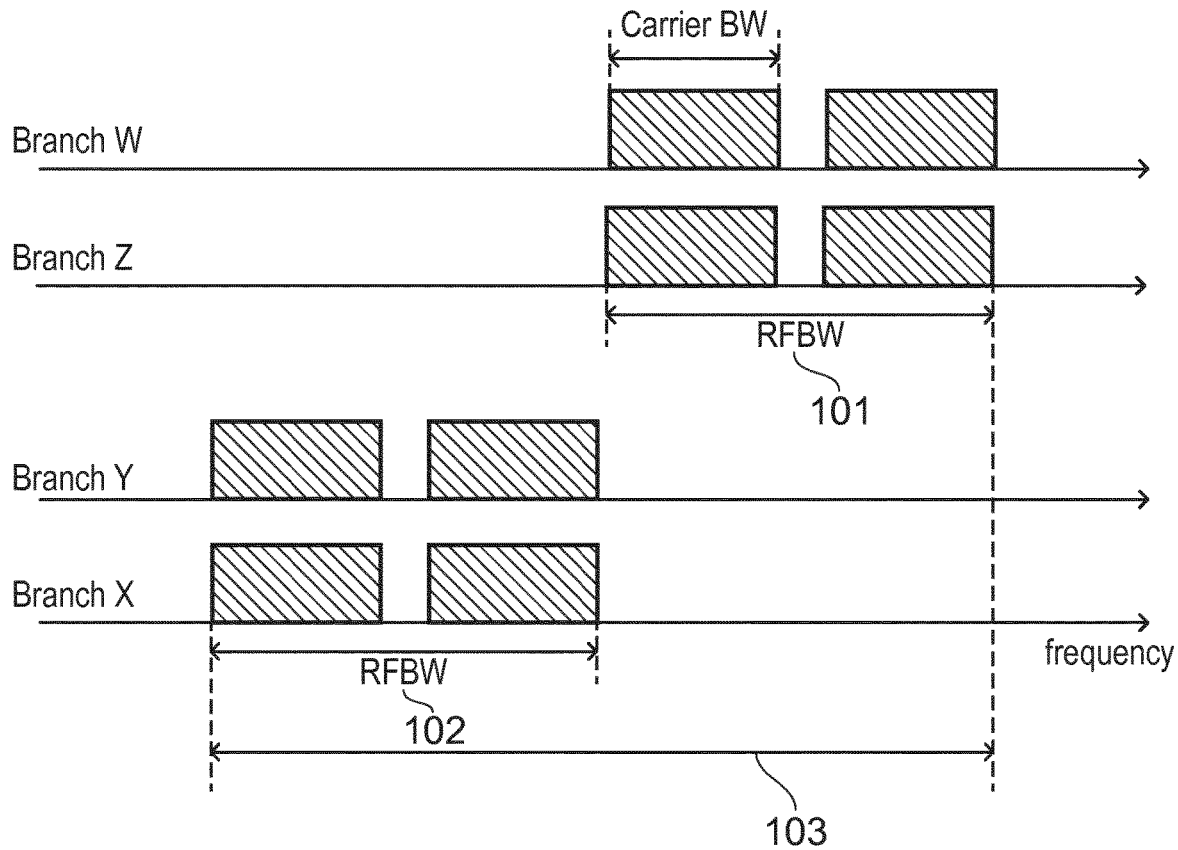
FIG. 1 illustrates a total bandwidth for an AAS.
FIG. 2 illustrates a method for configuring communication between a base station and at least one wireless device, the base station using an antenna array, wherein antenna ports in the antenna array are coupled to radio frequency branches according to some embodiments.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Embodiments described herein relate to methods and apparatuses to allow for flexible bandwidth utilisation. In particular, a first radio frequency bandwidth for a first radio frequency branch may be determined based on one or more factors associated with traffic served by a plurality of radio frequency bandwidth parts (e.g. subcarriers).

The invention introduces a mechanism to allow scheduler to determine each radio frequency bandwidth part's (here, radio frequency bandwidth part may be a partial frequency range in an entire carrier) branch number.

FIG. 2 illustrates a method for configuring communication between a base station and at least one wireless device, the base station using an antenna array, wherein antenna ports in the antenna array are coupled to radio frequency branches. It will be appreciated that each antenna port in the antenna array may be coupled to one or more physical antennas. The method may be performed by a scheduler in a network. The scheduler may form part of the base station or may be another node in the network.

In step 201, the method comprises determining a first radio frequency bandwidth (RFBW) for a first radio frequency branch (RF branch) based on one or more factors associated with traffic served by a plurality of radio frequency bandwidth parts. The plurality of radio frequency bandwidth parts may each comprise one or more subcarrier. The plurality of radio frequency bandwidth parts may for example comprise a first radio frequency bandwidth part and a second radio frequency bandwidth part. For example, the first radio frequency bandwidth part may comprise a first set of subcarriers, and the second radio frequency bandwidth part may comprise a second set of subcarriers.

Step 201 may further comprise determining a second RFBW for a second RF branch based on the one or more factors associated with the traffic served by the plurality of radio frequency bandwidth parts.

In step 202, the method comprises configuring the first RF branch to serve frequencies within the first RFBW.

Step 202 may further comprise configuring the second radio frequency branch to serve frequencies within the second radio frequency bandwidth. In some examples, the first RFBW and the second RFBW partially overlap.

Effectively, in step 201, the method allows for the allocation of different RFBWs to different RF branches based on the radio frequency bandwidth parts of the system, and what traffic they are carrying. In other words, the allocation of the different RFBWs may be performed unevenly across the total bandwidth, in order to accommodate for differing requirements of different radio frequency bandwidth parts. For example, in some cases a first radio frequency bandwidth part (of the plurality of radio frequency bandwidth parts) is served by a first number of RF branches and a second radio frequency bandwidth part (of the plurality of radio frequency bandwidth parts) is served by a second number of RF branches, wherein the first number is different to the second number.

It will, however, be appreciated that in some examples, the traffic being served by the radio frequency bandwidth parts in the system may be best served by evenly split RFBWs, for example as illustrated in FIG. 1. However, the method of FIG. 2 allows for the RFBWs to be distributed differently in some circumstances.

The impacts of not using all available RF branches to serve each radio frequency bandwidth part may be similarly to those described above with reference to FIG. 1. However, by allowing for the allocation of the RFBWs to be flexible, the impact on each radio frequency bandwidth part is not fixed and may be adjusted to account for the traffic being served by each radio frequency bandwidth part.

Figure 3:
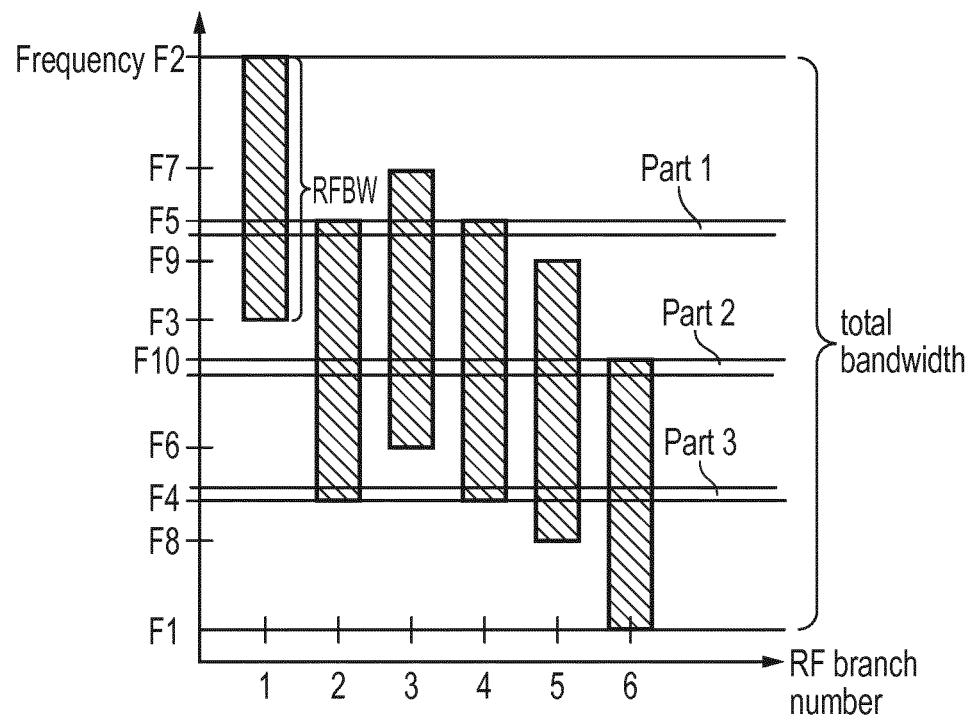
FIG. 3 illustrates an example of the allocation of RFBWs to different RF branches according to some embodiments.

FIG. 3 illustrates an example of the allocation of RFBWs to different RF branches according to some embodiments.

In this example, the total bandwidth served by the system spans from frequency F1 to frequency F2. The RF branch 1 serves a first RFBW from F3 to F2. The RF branch 2 and RF branch 4 serve a second RFBW from F4 to F5. The RF branch 3 serves a third RFBW from F6 to F7. RF branch 5 serves a fourth RFBW from F8 to F9. RF branch 6 serves a fifth RFBW from F1 to F10.

As can be seen, in this example therefore, the radio frequency bandwidth part, Part 1 is served by 4 RF branches namely RF branches 1 to 4. Radio frequency bandwidth part, Part 2 RF branches 2 to 6. Radio frequency bandwidth part, Part 3, is served by RF branches 2 and 4 to 6. The radio frequency bandwidth parts are therefore served by a different numbers of RF branches.

In this example, the RFBWs served by the different branches partially overlap, however, it will be appreciated that in some examples, the different RFBWs may not overlap.

In some examples the RFBWs may be configured for use in an uplink direction or a downlink direction. In other words, the configuration may be different for the uplink and downlink directions. For example, the method of FIG. 2 may comprise allocating the first radio frequency bandwidth to a first radio frequency branch for use in uplink communication, and allocating a second radio frequency bandwidth to the first radio frequency branch for use in downlink communication. This difference in the uplink and downlink configurations may be due to differing considerations applied for the uplink and downlink directions.

In some examples, step 201 of FIG. 2 may comprise determining the first number based on the one or more factors associated with the first radio frequency bandwidth part; and selecting the first radio frequency bandwidth for the first radio frequency branch based on the first number.

In some examples, the one or more factors comprises whether the first radio frequency bandwidth part is serving a wireless device having at least one radio condition not meeting a predetermined criteria. For example, wireless devices located towards a cell edge may represent a power limited case (e.g. a power related radio condition may not meet a predetermined criteria). These wireless devices may benefit from being served by a higher number of RF branches. A wireless device may have a limited maximum output power (normally 23 dBm in 4G/5G). This maximum output power may then determine the coverage of in the uplink direction. It may be that the only way to increase the uplink coverage is to increase the antenna gain of the base station. This may be performed by using more antenna elements, and therefore more RF branches in the base station to serve the first radio frequency bandwidth part. Similarly in the downlink direction, by using more RF branches when transmitting to a particular wireless device, the antenna gain, but also the total power used for this wireless device may be increased.

For example, wireless devices having a radio condition not meeting a predetermined criteria may comprise wireless devices to which serval HARQ retransmissions has been performed. In this case, the HARQ process may fail if next HARQ retransmission fails again, and if HARQ process fail, it will may trigger Radio Link Control RLC retransmission which may result in too much latency for uplink data transmission, or packet drops for VoIP services.

In these examples, the step 201 may comprise, responsive to the first radio frequency bandwidth part serving a wireless device having at least one radio condition not meeting a predetermined criteria, setting the first number as higher than if the first radio frequency bandwidth part was not serving a wireless device at least one radio condition not meeting a predetermined condition. In other words, it will be appreciated that in these examples increasing the uplink allocated bandwidth to each wireless device, may not be beneficial to uplink throughput (due to power limitation of the wireless device), but increasing the uplink number of receiving RF branches may improve the uplink sensitivity.

In some examples, the one or more factors comprises whether the first radio frequency bandwidth part is serving a wireless device having high or low Guaranteed Bit Rate, GBR, requirement.

In these examples step 201 may comprise responsive to the first radio frequency bandwidth part serving a wireless device having a first GBR requirement, setting the first number as higher than if the first radio frequency bandwidth part was serving a wireless device having a second GBR requirement higher than the first GBR requirement.

In some examples, the one or more factors comprises a number of wireless devices served by the first radio frequency bandwidth part.

In these examples step 201 may comprise determining the first number such that the first number increases with the number of wireless devices served by the first radio frequency bandwidth part.

For example, it may be desirable for more RF branches to be allocated to a radio frequency bandwidth part if multiple wireless devices are performing MU-MIMO (Multi-User MIMO) with high number of multiplexing layers (which may cause interference especially MU-MIMO self-interference). In this example, increasing the number of uplink receiving RF branches may significantly increase uplink interference suppression capability at base station side. On the other hand, if a wireless device is in a cell center and served as SU-MIMO (Single User MIMO) mode or MU-MIMO but with lower number of multiplexing layers, the wireless device may have relatively a higher power headroom to support more bandwidth if each radio frequency bandwidth part's channel capacity is reduced due to a low number of RF branches serving the radio frequency bandwidth part. In this case, the base station may use fewer receiving RF branches to serve the wireless device with required throughput.

In general, it will be appreciated that some wireless devices may be adequately served with fewer receiving RF branches, while other wireless devices may require more RF branches. The scheduler may allocate a number of RF branches to the radio frequency bandwidth parts, and may then allocate RFBWs to the RF branches accordingly.

For some common channels, for example Sounding Reference Signals SRS, in order for the base station to receive full frequency coverage, the base station may receive multiple SRS on fractional frequency pieces on different branches, and may combine the signals received on the different branches to determine an SRS covering total bandwidth.

For downlink (DL) communication different channels may use different approaches to adapt flexible RFBW.

Figure 4A:
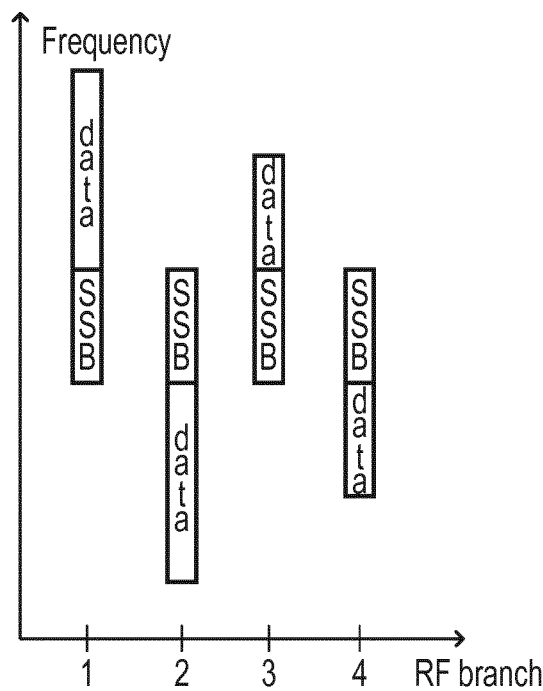
FIGS. 4a and 4b illustrate allocation of radio frequency bandwidth to RF branches for serving an SSB channel according to some embodiments.

For example, step 201 may comprise responsive to the first radio frequency bandwidth part serving a synchronization signal block SSB channel, setting the first number as equal to a total number of radio frequency branches. In other words, in order to transmit the SSB channel with enough power, it may be transmitted on all RF branches. In this example, the SSB channel may be attributed to only part of the RFBW served by each branch, for example, as illustrated in FIG. 4a. The overlapping parts of each RFBW for each RF branch are serving the SSB channel, but the remaining parts of each RFBW may be flexibly used for data transmission. A similar procedure may be performed in response to the first radio frequency bandwidth part serving a Physical Downlink Shared Channel (PDSCH) (PDCCH in Control-resource set (CORESET)) (instead of SSB). The PDSCH is self-contained channel with Demodulation Reference Signal (DMRS), therefore the wireless device will not assume inter-TTI filtering DMRS, and hence dynamically changing the partial BW allocation based on scheduler is allowable.

Figure 4B:
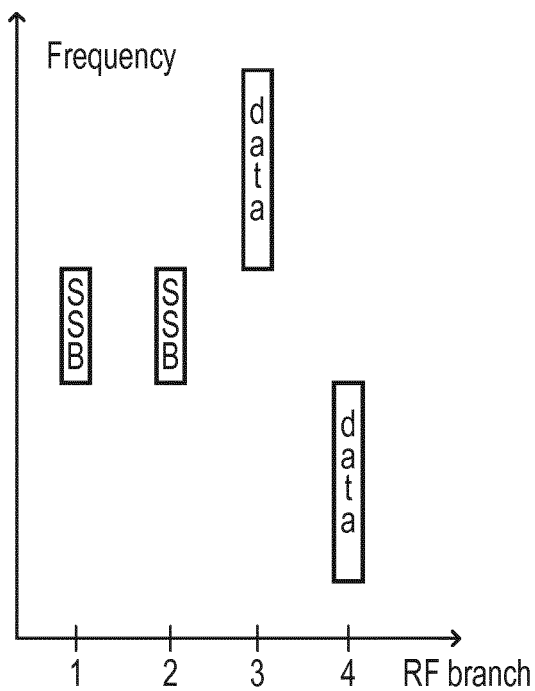

Alternatively, in order to transmit the SSB channel with enough power, the SSB channel may be transmitted across the entire RFBW of only some of the radio frequency branches, as illustrated in FIG. 4b. In FIG. 4b the full RFBW of RF branches 1 and 2 is used to transmit the SSB. In other words, step 201 may comprise responsive to the first radio frequency bandwidth part serving a synchronization signal block, SSB, channel, configuring the SSB channel to be transmitted using the entire radio frequency bandwidth of the RF branches allocated to the first radio frequency bandwidth part.

For some channels, for example Channel State Information Reference Signals (CSI-RS) it may be necessary for the channel to be transmitted across the full total bandwidth. For example, for acquiring Reference Signal Received Power (RSRP) information and any related link adaption. In these circumstances, frequency hopping may be used.

For example, the method may comprise, responsive to transmitting a channel state information reference signal, CSI-RS, using a first RFBW on a first radio frequency branch in a first transmission time interval, transmitting the CSI-RS using a second RFBW on the first radio frequency branch in a second transmission time interval. In this example, the first radio frequency bandwidth and the second radio frequency bandwidth may together cover the total bandwidth served by the antenna array. It will be appreciated that any number of frequency hops may be used to cover the full total bandwidth. A similar procedure may be performed for transmitting LTE PDCCH and/or CRS (instead of CSI-RS).

The scheduling based on CSI-RS may be periodic, semi-persistent or aperiodic.

Figure 5:
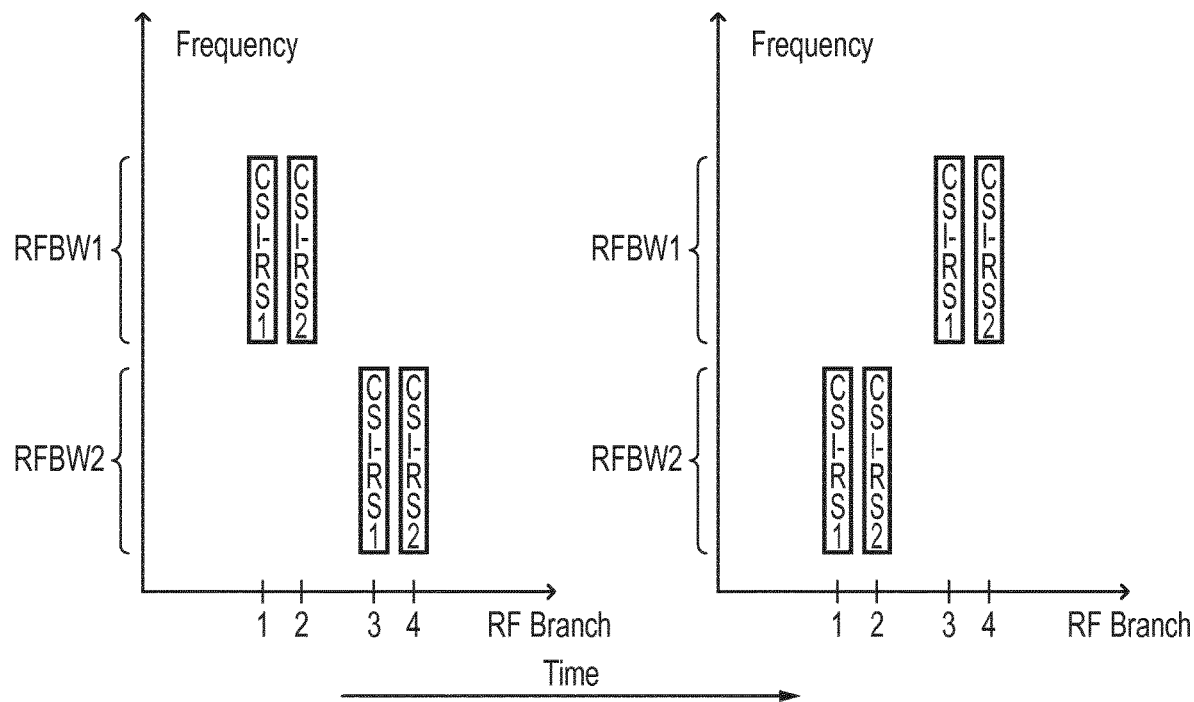
FIG. 5 illustrates an example in which two CSI-RS are transmitted according to some embodiments.

FIG. 5 illustrates an example in which two CSI-RS are transmitted. In this example two frequency hops are utilized. It will be appreciated that in some examples more than two CSI-RS may be transmitted, and/or more than two frequency hops may be used.

In the first time instance (i.e the first frequency hop), illustrated by the left hand graph, the RF branch 1 transmits CSI-RS 1 using RFBW 1 and RF branch 2 transmits CSI-RS 2 using RFBW 1. In the same time instance (e.g. the first time instance), RF branch 3 transmits CSI-RS 1 using RFBW 2 and RF branch 4 transmits CSI-RS 2 using RFBW 2. In this example, each branch may be required to transmit the CSI-RS across the full total bandwidth, therefore in the second time instance (e.g. the second frequency hop) represented by the right hand graph, the RF branches transmit the same CSI-RS on the other RFBW. For example, in the second time instance, the RF branch 1 transmits CSI-RS 1 on using RFBW 2 and RF branch 2 transmits CSI-RS 2 using RFBW 2. Similarly, RF branch 3 transmits CSI-RS 1 on RFBW 1 and RF branch 4 transmits CSI-RS 2 on RFBW 1.

Figure 6:
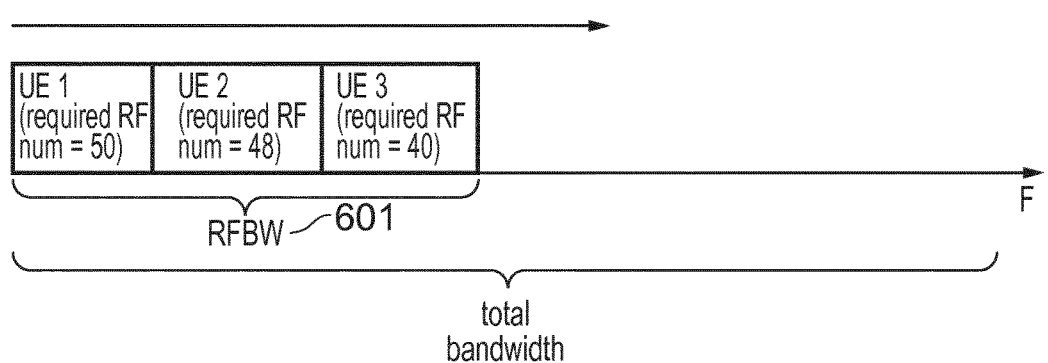
FIG. 6 illustrates uplink scheduling of wireless devices according to some embodiments.

FIG. 6 illustrates uplink scheduling of wireless devices according to some embodiments.

For each Transmission Time Interval (TTI), the scheduler may be responsible for detailed traffic allocation on different frequency resources. The scheduler may therefore be responsible for controlling UL RFBW configuration. However, the scheduler is not standardized, but implementation specific. FIG. 6 therefore illustrates an example of how the scheduler may perform the method in FIG. 2.

In this example, the method of FIG. 2 may further comprise determining a subset of wireless devices, wherein each wireless device in the subset is sensitive to a number of radio frequency branches serving a radio frequency bandwidth part associated with the wireless device. In other words, the scheduler may determine which wireless devices would benefit from a higher number of RF branches serving them. The methods described above may be utilized to make this determination.

In the example of FIG. 6, the subset of wireless devices comprises wireless devices UE1, UE2 and UE3 which are determined to be wireless devices that are sensitive to the number of RF branches serving them.

The method may then further comprise scheduling the subset of wireless devices such that the radio frequency bandwidth parts serving the subset of wireless devices comprise contiguous frequency resources. In other words, the scheduler may place the wireless devices that require a high number of RF branches close together within the total bandwidth (for example at one end of the total bandwidth), for example, so that as many as possible of the subset of wireless devices fall within a single RFBW 601. The RFBW 601 that the subset of wireless devices has been allocated to, may then be more easily allocated to a high number of RF branches. This is compared to say, if the subset of wireless devices were split across the total bandwidth, then more RF branches would be required to serve the same number of wireless devices.

The RFBW 601 that the subset of wireless devices has been allocated to may then be allocated to a number of RF branches, wherein the number of RF branches is set as the highest number of RF branches required by any one of the subset of wireless devices. For example, if UE 1 requires 50 RF branches, UE 2 requires 48 RF branches, and UE 3 requires 40 branches, then the RFBW 601 will be allocated to 50 branches.

The method may then further comprise calculating a remaining number of RF branches. For example, the remaining number of RF branches may be the total number of RF branches minus the number of RF branches allocated to RFBW 601. In this example, the remaining number of branches is (supposing a 64 RF branch TRX system) therefore 64−50=14.

The remaining number of RF branches (e.g. the 14 remaining RF branches) may then be allocated to the other wireless devices (e.g. those falling outside of the subset of wireless devices) in a legacy fashion (for example an equal number of RF branches serving each radio frequency bandwidth part).

Figure 7:
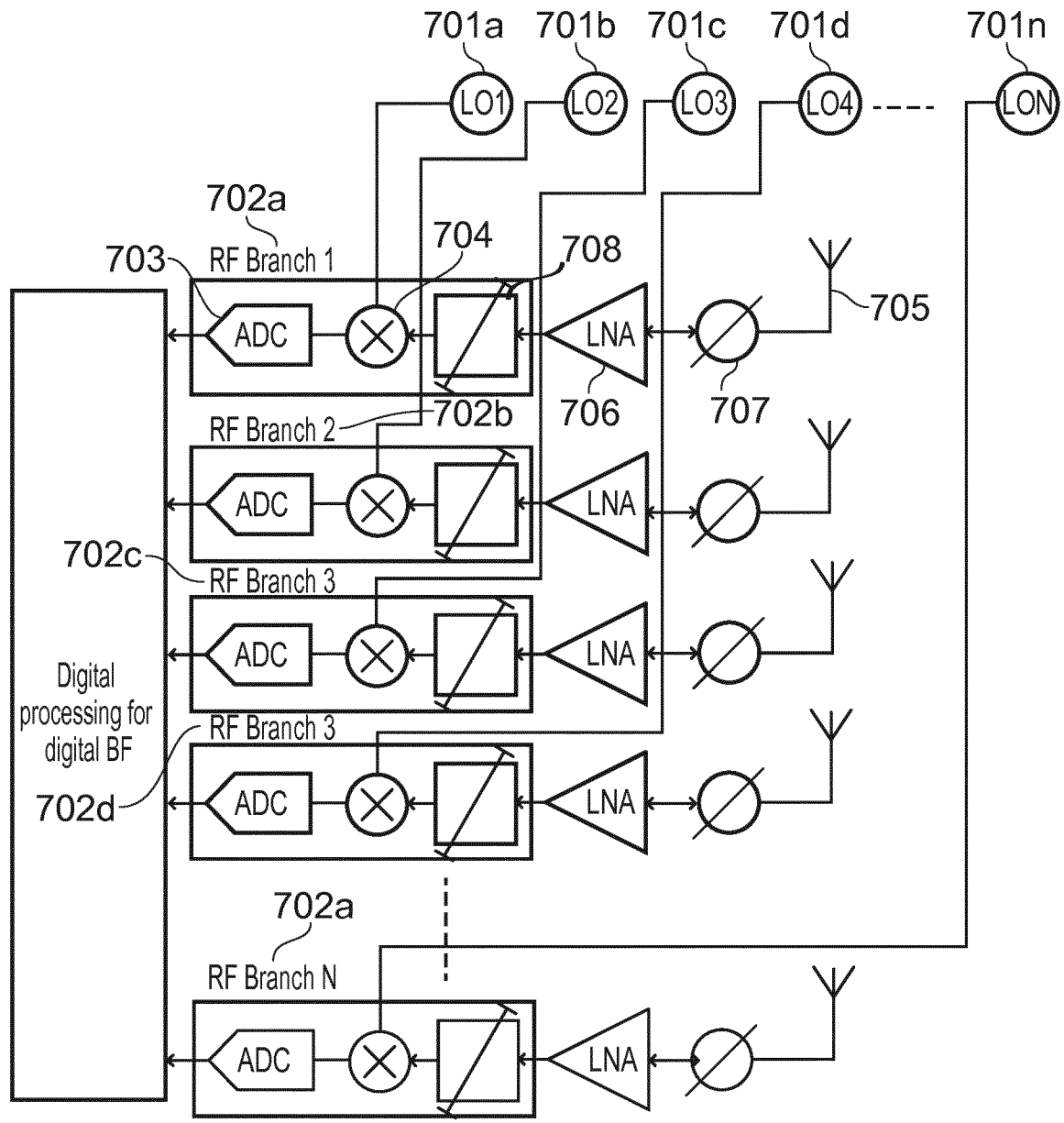
FIG. 7 illustrates an example of implementation of a base station according to some embodiments.

FIG. 7 illustrates an example of implementation of a base station 700 according to some embodiments.

In order to support providing different RFBWs at different RF branches in order to span a total radio frequency bandwidth, Local Oscillators (LOs) 701*a* to 701*n* may be coupled to each RF branch 702*a* to 702*n*. The Local Oscillators may then be configured by the scheduler (which may form part of the base station, or may form part of a different node in the network, which may remotely control the LOs in the base station). By programming the LOs with different values, the central frequencies of the RFBW provided by each RF branch may be dynamically adjusted.

Each RF branch 702*a* to 702*n* may comprise an Analog to Digital Converter (ADC) 703 a multiplier 704 to shift the central frequency of the RFBW, an antenna 705 (or plurality of antennas coupled to an antenna port), an amplifier such as a low noise amplifier (LNA) 706 configured to amplify the received signal. Each RF branch may then further comprise a phase shifter 707 and an Automatic Gain Control (AGC) 708.

For a TDD structure, adjustments to the LOs may be applied during guard bands or specific subframes, for example, to avoid impact to DL or UL traffic. For example, changing UL LO for the next UL slot may be performed during a prior DL slot if different LO's are used for UL and DL.

For an FDD structure, the adjustments to the LOs may be interrupt traffic, so scheduling may be necessary to avoid adjustments to the LOs occurring during transmitting or receiving.

In FIG. 7 a LO for a zero-IF receiver is illustrated, but similar structures may be applied for a transmitter also.

Figure 8:
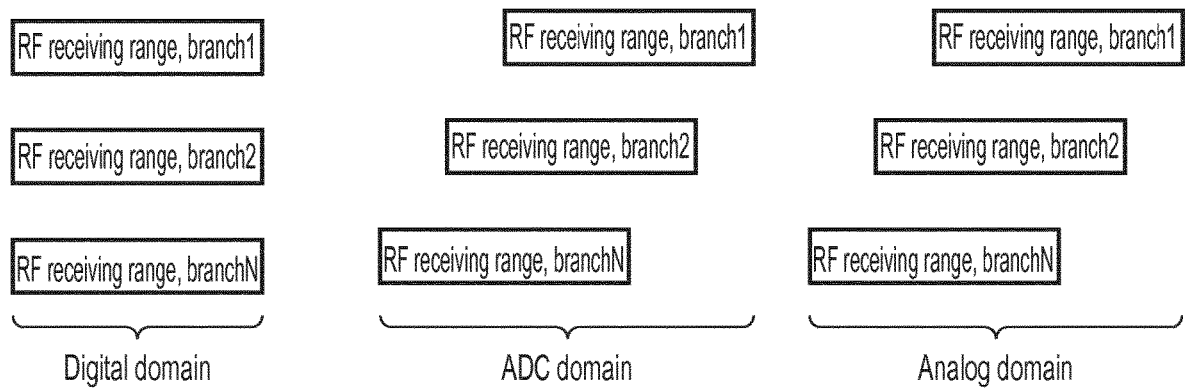
FIG. 8 illustrates how different radio frequency bandwidths received in on each radio frequency branch may converted in the digital domain according to some embodiments.

FIG. 8 illustrates how the different RFBWs received in each branch (RF Branch 1, 2 and N illustrated here) may be converted in the digital domain, for example using digital numerically controlled oscillator (NCO) conversion.

Figure 9:
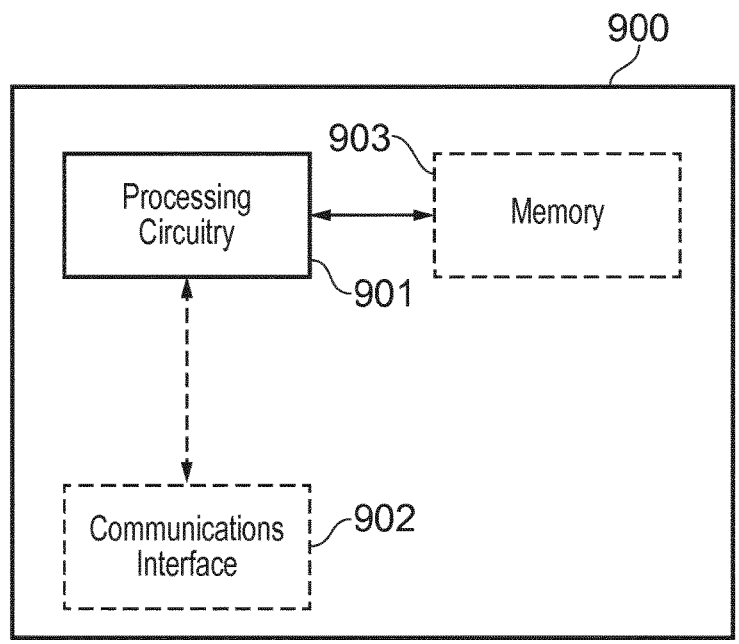
FIG. 9 illustrates a scheduler comprising processing circuitry (or logic) according to some embodiments.

FIG. 9 illustrates a scheduler 900 comprising processing circuitry (or logic) 901. The processing circuitry 901 controls the operation of the scheduler 900 and can implement the method described herein in relation to a scheduler 900. The processing circuitry 901 can comprise one or more processors, processing units, multi-core processors or modules that are configured or programmed to control the scheduler 900 in the manner described herein. In particular implementations, the processing circuitry 901 can comprise a plurality of software and/or hardware modules that are each configured to perform, or are for performing, individual or multiple steps of the method described herein in relation to the scheduler 900.

Briefly, the scheduler 900 is configured to determine a first radio frequency bandwidth for a first radio frequency branch based on one or more factors associated with traffic served by a plurality of radio frequency bandwidth parts, and configure the first radio frequency branch to serve frequencies within the first radio frequency bandwidth.

In some embodiments, the scheduler 900 may optionally comprise a communications interface 902. The communications interface 902 of the scheduler 900 can be for use in communicating with other nodes, such as other virtual nodes. For example, the communications interface 902 of the scheduler 900 can be configured to transmit to and/or receive from other nodes requests, resources, information, data, signals, or similar. The processing circuitry 901 of scheduler 900 may be configured to control the communications interface 902 of the scheduler 900 to transmit to and/or receive from other nodes requests, resources, information, data, signals, or similar.

Optionally, the scheduler 900 may comprise a memory 903. In some embodiments, the memory 903 of the scheduler 900 can be configured to store program code that can be executed by the processing circuitry 901 of the scheduler 900 to perform the method described herein in relation to the scheduler 900. Alternatively or in addition, the memory 903 of the scheduler 900, can be configured to store any requests, resources, information, data, signals, or similar that are described herein. The processing circuitry 901 of the scheduler 900 may be configured to control the memory 903 of the scheduler 900 to store any requests, resources, information, data, signals, or similar that are described herein.

Figure 10:
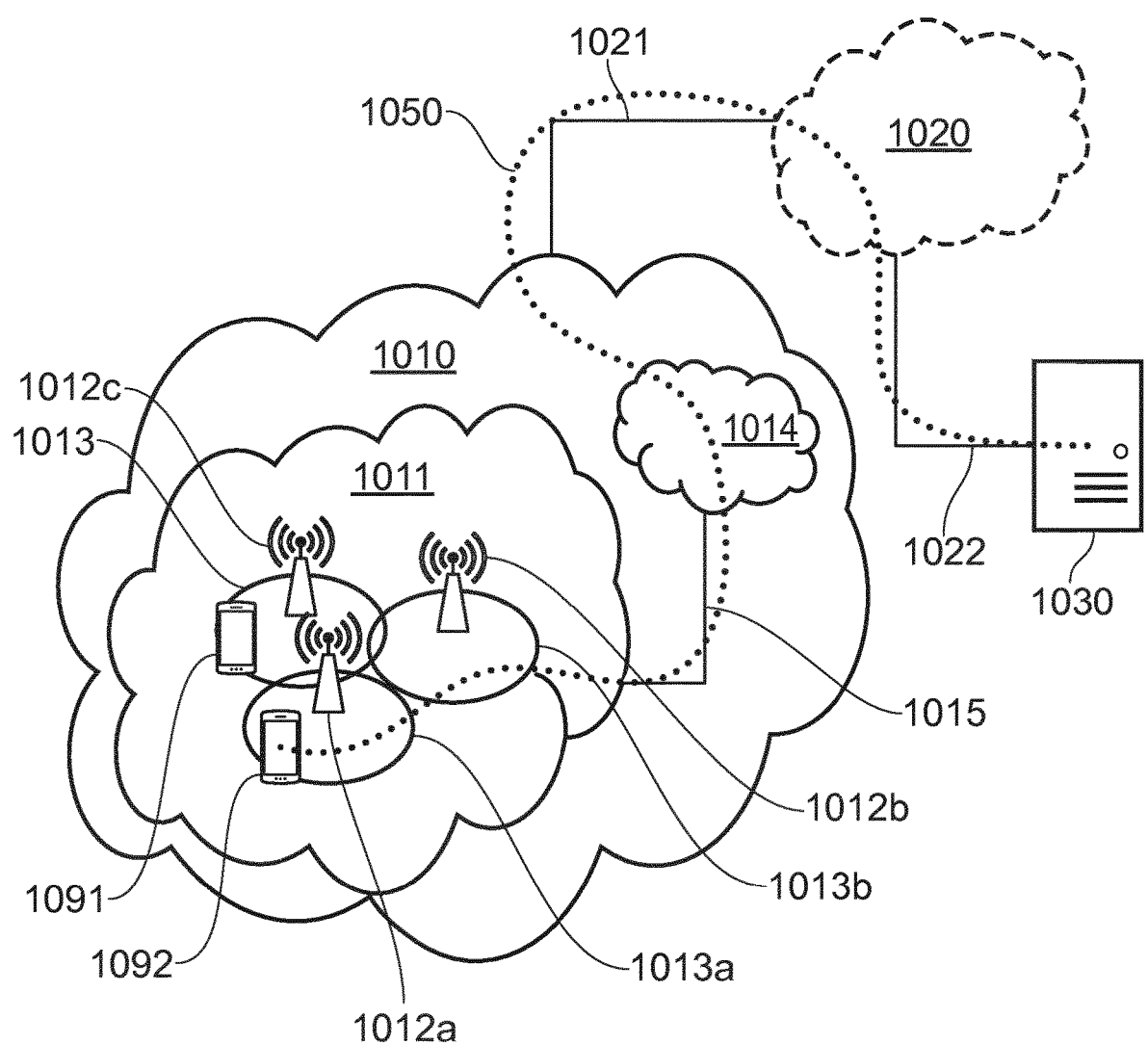
FIG. 10 illustrates a telecommunication network connected via an intermediate network to a host computer in accordance with some embodiments.

With reference to FIG. 10, in accordance with an embodiment, a communication system includes a telecommunication network 1010, such as a 3GPP-type cellular network, which comprises an access network 1011, such as a radio access network, and a core network 1014. The access network 1011 comprises a plurality of base stations 1012*a*, 1012*b*, 1012*c*, such as NBs, eNBs, gNBs or other types of wireless access points, each defining a corresponding coverage area 1013*a*, 1013*b*, 1013*c*. Each base station 1012*a*, 1012*b*, 1012*c* is connectable to the core network 1014 over a wired or wireless connection 1015. A first user equipment (UE) 1091 located in coverage area 1013*c* is configured to wirelessly connect to, or be paged by, the corresponding base station 1012*c*. A second UE 1092 in coverage area 1013*a* is wirelessly connectable to the corresponding base station 1012*a*. While a plurality of UEs 1091, 1092 are illustrated in this example, the disclosed embodiments are equally applicable to a situation where a sole UE is in the coverage area or where a sole UE is connecting to the corresponding base station 1012. It will be appreciated that the base station 1012 may comprise a scheduler as described above with reference to FIGS. 2 to 9, or may be controller by a scheduler as described above.

The telecommunication network 1010 is itself connected to a host computer 1030, which may be embodied in the hardware and/or software of a standalone server, a cloud-implemented server, a distributed server or as processing resources in a server farm. The host computer 1030 may be under the ownership or control of a service provider, or may be operated by the service provider or on behalf of the service provider. The connections 1021, 1022 between the telecommunication network 1010 and the host computer 1030 may extend directly from the core network 1014 to the host computer 1030 or may go via an optional intermediate network 1020. The intermediate network 1020 may be one of, or a combination of more than one of, a public, private or hosted network; the intermediate network 1020, if any, may be a backbone network or the Internet; in particular, the intermediate network 1020 may comprise two or more sub-networks (not shown).

The communication system of FIG. 10 as a whole enables connectivity between one of the connected UEs 1091, 1092 and the host computer 1030. The connectivity may be described as an over-the-top (OTT) connection 1050. The host computer 1030 and the connected UEs 1091, 1092 are configured to communicate data and/or signaling via the OTT connection 1050, using the access network 1011, the core network 1014, any intermediate network 1020 and possible further infrastructure (not shown) as intermediaries. The OTT connection 1050 may be transparent in the sense that the participating communication devices through which the OTT connection 1050 passes are unaware of routing of uplink and downlink communications. For example, a base station 1012 may not or need not be informed about the past routing of an incoming downlink communication with data originating from a host computer 1030 to be forwarded (e.g., handed over) to a connected UE 1091. Similarly, the base station 1012 need not be aware of the future routing of an outgoing uplink communication originating from the UE 1091 towards the host computer 1030.

Example implementations, in accordance with an embodiment, of the UE, base station and host computer discussed in the preceding paragraphs will now be described with reference to FIG. 11. In a communication system 1100, a host computer 1110 comprises hardware 1115 including a communication interface 1116 configured to set up and maintain a wired or wireless connection with an interface of a different communication device of the communication system 1100. The host computer 1110 further comprises processing circuitry 1118, which may have storage and/or processing capabilities. In particular, the processing circuitry 1118 may comprise one or more programmable processors, application-specific integrated circuits, field programmable gate arrays or combinations of these (not shown) adapted to execute instructions. The host computer 1110 further comprises software 1111, which is stored in or accessible by the host computer 1110 and executable by the processing circuitry 1118. The software 1111 includes a host application 1112. The host application 1112 may be operable to provide a service to a remote user, such as a UE 1130 connecting via an OTT connection 1150 terminating at the UE 1130 and the host computer 1110. In providing the service to the remote user, the host application 1112 may provide user data which is transmitted using the OTT connection 1150.

The communication system 1100 further includes a base station 1120 provided in a telecommunication system and comprising hardware 1125 enabling it to communicate with the host computer 1110 and with the UE 1130. The hardware 1125 may include a communication interface 1126 for setting up and maintaining a wired or wireless connection with an interface of a different communication device of the communication system 1100, as well as a radio interface 1127 for setting up and maintaining at least a wireless connection 1170 with a UE 1130 located in a coverage area (not shown in FIG. 11) served by the base station 1120. The communication interface 1126 may be configured to facilitate a connection 1160 to the host computer 1110. The connection 1160 may be direct or it may pass through a core network (not shown in FIG. 11) of the telecommunication system and/or through one or more intermediate networks outside the telecommunication system. In the embodiment shown, the hardware 1125 of the base station 1120 further includes processing circuitry 1128, which may comprise one or more programmable processors, application-specific integrated circuits, field programmable gate arrays or combinations of these (not shown) adapted to execute instructions. The base station 1120 further has software 3101 stored internally or accessible via an external connection.

The communication system 1100 further includes the UE 1130 already referred to. Its hardware 1113 may include a radio interface 1115 configured to set up and maintain a wireless connection 1170 with a base station serving a coverage area in which the UE 1130 is currently located. The hardware 1113 of the UE 1130 further includes processing circuitry 1138, which may comprise one or more programmable processors, application-specific integrated circuits, field programmable gate arrays or combinations of these (not shown) adapted to execute instructions. The UE 1130 further comprises software 1131, which is stored in or accessible by the UE 1130 and executable by the processing circuitry 1138. The software 1131 includes a client application 1110. The client application 1110 may be operable to provide a service to a human or non-human user via the UE 1130, with the support of the host computer 1110. In the host computer 1110, an executing host application 1112 may communicate with the executing client application 1110 via the OTT connection 1150 terminating at the UE 1130 and the host computer 1110. In providing the service to the user, the client application 1110 may receive request data from the host application 1112 and provide user data in response to the request data. The OTT connection 1150 may transfer both the request data and the user data. The client application 1110 may interact with the user to generate the user data that it provides.

Figure 11:
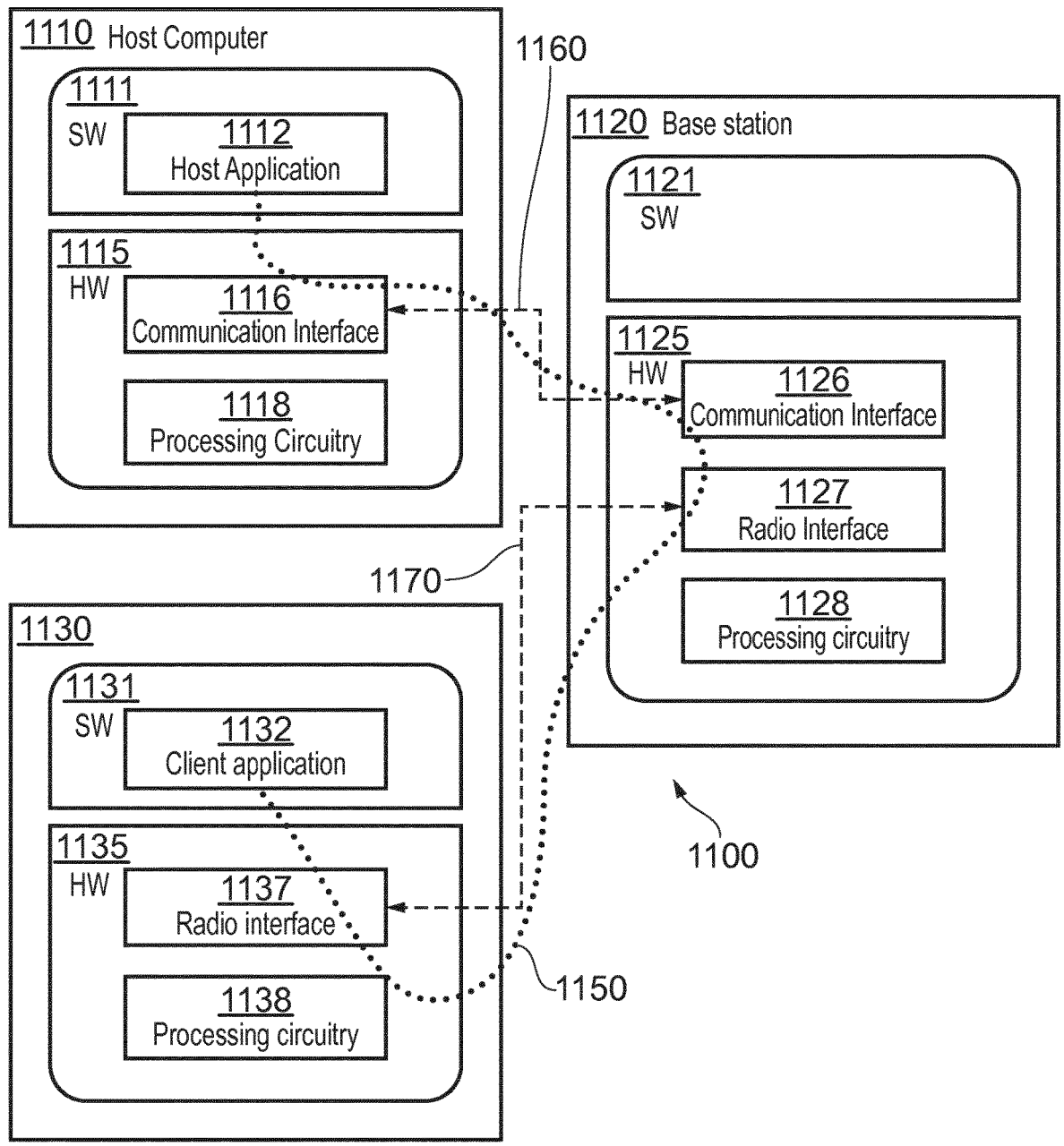
FIG. 11 illustrates a host computer communicating via a base station with a user equipment over a partially wireless connection in accordance with some embodiments.

It is noted that the host computer 1110, base station 1120 and UE 1130 illustrated in FIG. 11 may be identical to the host computer 1030, one of the base stations 1012$a$, 1012$b$, 1012$c$ and one of the UEs 1091, 1092 of FIG. 10, respectively. This is to say, the inner workings of these entities may be as shown in FIG. 11 and independently, the surrounding network topology may be that of FIG. 10.

In FIG. 11, the OTT connection 1150 has been drawn abstractly to illustrate the communication between the host computer 1110 and the use equipment 1130 via the base station 1120, without explicit reference to any intermediary devices and the precise routing of messages via these devices. Network infrastructure may determine the routing, which it may be configured to hide from the UE 1130 or from the service provider operating the host computer 1110, or both. While the OTT connection 1150 is active, the network infrastructure may further take decisions by which it dynamically changes the routing (e.g., on the basis of load balancing consideration or reconfiguration of the network).

The wireless connection 1170 between the UE 1130 and the base station 1120 is in accordance with the teachings of the embodiments described throughout this disclosure. [If the radio-related invention has not yet been formulated at the time of drafting a provisional application, the expression "embodiments described throughout this disclosure" is meant to refer to the radio-related embodiments disclosed elsewhere in the application.] One or more of the various embodiments improve the performance of OTT services provided to the UE 1130 using the OTT connection 1150, in which the wireless connection 1170 forms the last segment. More precisely, the teachings of these embodiments may improve the coverage of the system by allocating more RF branches to wireless devices with poor radio coverage (for example located at the cell edge).

A measurement procedure may be provided for the purpose of monitoring data rate, latency and other factors on which the one or more embodiments improve. There may further be an optional network functionality for reconfiguring the OTT connection 1150 between the host computer 1110 and UE 1130, in response to variations in the measurement results. The measurement procedure and/or the network functionality for reconfiguring the OTT connection 1150 may be implemented in the software 1111 of the host computer 1110 or in the software 1131 of the UE 1130, or both. In embodiments, sensors (not shown) may be deployed in or in association with communication devices through which the OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of the OTT connection 1150 may include message format, retransmission settings, preferred routing etc.; the reconfiguring need not affect the base station 1120, and it may be unknown or imperceptible to the base station 1120. Such procedures and functionalities may be known and practiced in the art. In certain embodiments, measurements may involve proprietary UE signaling facilitating the host computer's 1110 measurements of throughput, propagation times, latency and the like. The measurements may be implemented in that the software 1111, 1131 causes messages to be transmitted, in particular empty or 'dummy' messages, using the OTT connection 1150 while it monitors propagation times, errors etc.

Figure 12:
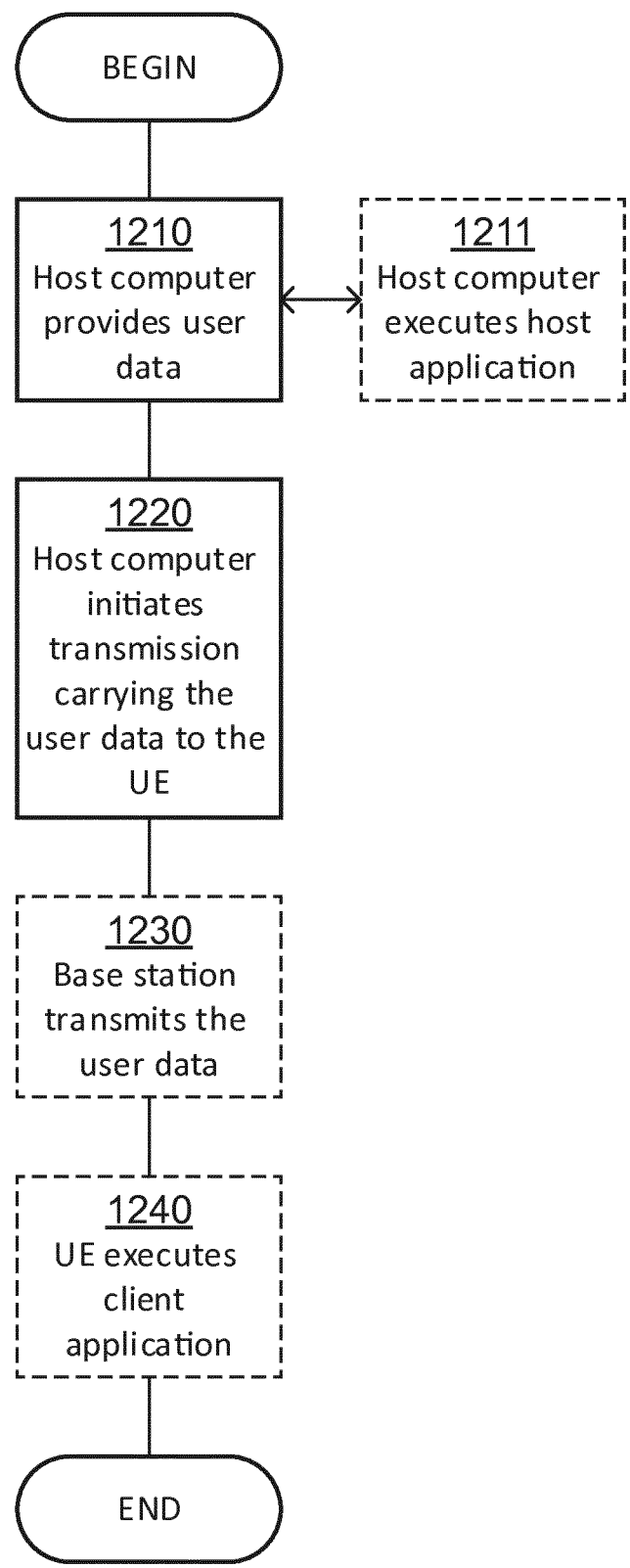
FIG. 12 illustrates methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In a first step 1210 of the method, the host computer provides user data. In an optional substep 1211 of the first step 1210, the host computer provides the user data by executing a host application. In a second step 1220, the host computer initiates a transmission carrying the user data to the UE. In an optional third step 1230, the base station transmits to the UE the user data which was carried in the transmission that the host computer initiated, in accordance with the teachings of the embodiments described throughout this disclosure. In an optional fourth step 1240, the UE executes a client application associated with the host application executed by the host computer.

Figure 13:
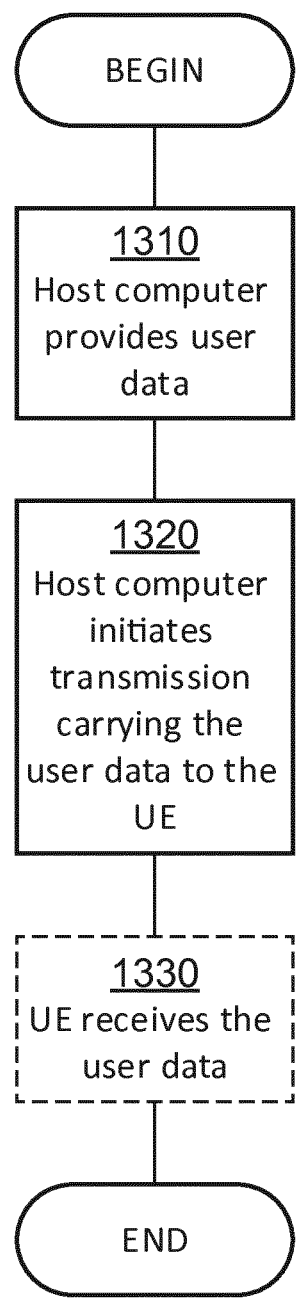
FIG. 13 illustrates methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In a first step 1310 of the method, the host computer provides user data. In an optional substep (not shown) the host computer provides the user data by executing a host application. In a second step 1320, the host computer initiates a transmission carrying the user data to the UE. The transmission may pass via the base station, in accordance with the teachings of the embodiments described throughout this disclosure. In an optional third step 1330, the UE receives the user data carried in the transmission.

Figure 14:
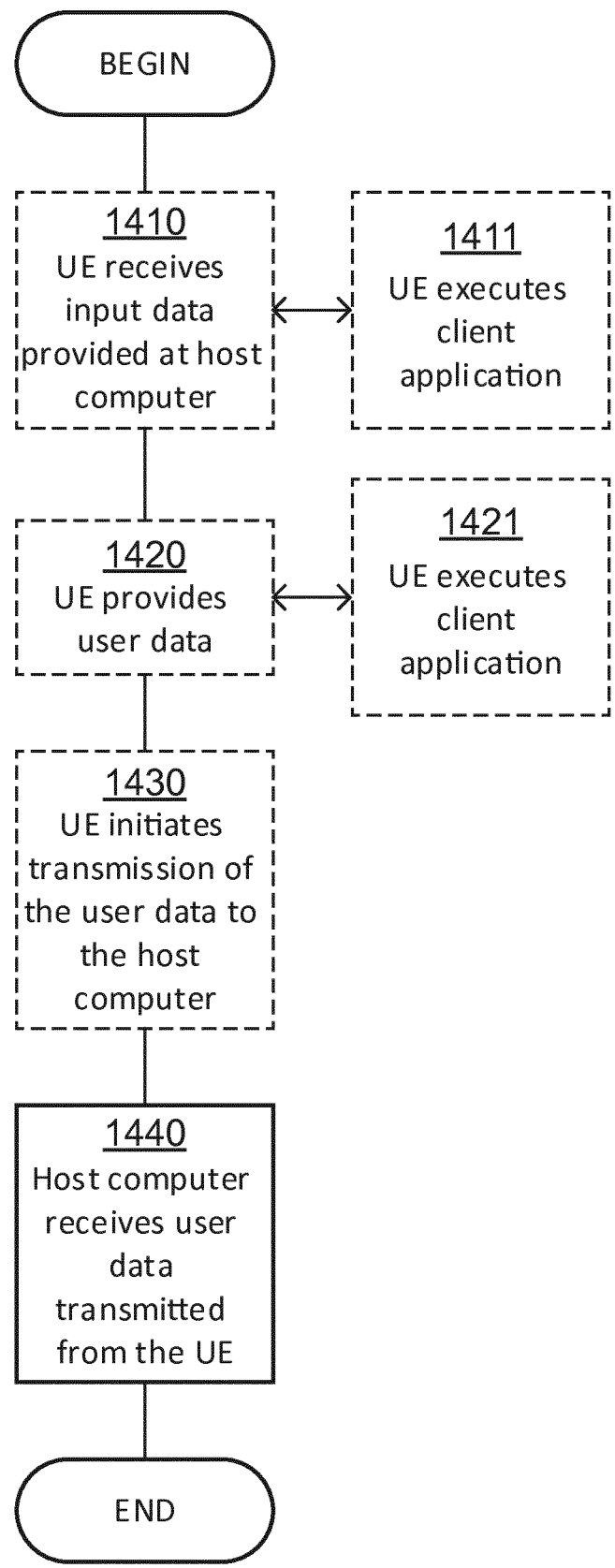
FIG. 14 illustrates methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In an optional first step 1410 of the method, the UE receives input data provided by the host computer. Additionally or alternatively, in an optional second step 1420, the UE provides user data. In an optional substep 1421 of the second step 1420, the UE provides the user data by executing a client application. In a further optional substep 1411 of the first step 1410, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1430, transmission of the user data to the host computer. In a fourth step 1440 of the method, the host computer receives the user data transmitted from the UE, in accordance with the teachings of the embodiments described throughout this disclosure.

Figure 15:
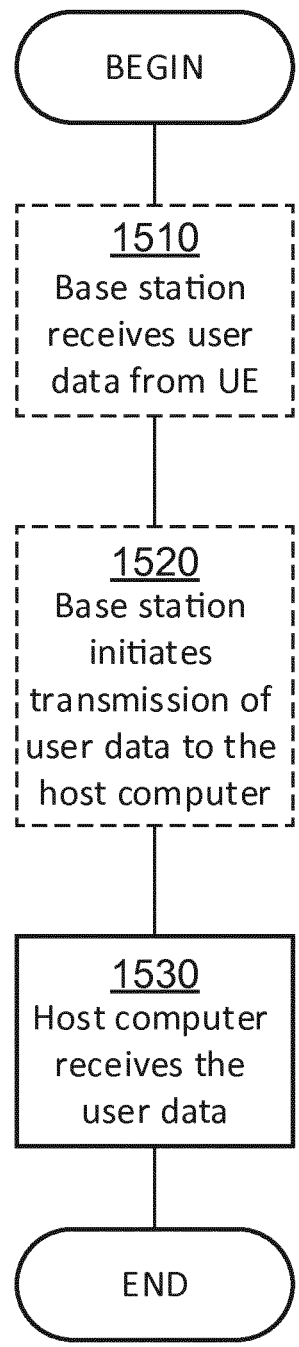
FIG. 15 illustrates methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In an optional first step 1510 of the method, in accordance with the teachings of the embodiments described throughout this disclosure, the base station receives user data from the UE. In an optional second step 1520, the base station initiates transmission of the received user data to the host computer. In a third step 1530, the host computer receives the user data carried in the transmission initiated by the base station.

There is therefore provided methods and apparatuses for flexibly allocating RFBWs to different RF branches across a total bandwidth. A scheduler may allocate a different number of RF branches to serve radio frequency bandwidth parts associated with different wireless devices, for example, depending on their demand. In UL, more RF branches may be allocated to wireless devices having poor radio conditions, or to wireless devices under some GBR constraint. In DL, different RFBWs may be allocated to different channels depending on channel specific requirements. In particular embodiments described herein may be compatible with standard, and therefore easy to implement, may have no impact on traffic, may be flexible for different base station configurations, provide improved resource and energy efficiency capacity, may not require extra processing, and the resource allocation may follow traffic demand.

The invention claimed is:

1. A method for configuring communication between a base station and at least one wireless device, the base station using an antenna array having a plurality of antenna ports coupled to radio frequency branches; the method comprising:
   determining a first radio frequency bandwidth for a first radio frequency branch based on one or more factors associated with traffic served by a plurality of radio frequency bandwidth parts within a total bandwidth of the antenna array, and
   configuring the first radio frequency branch to serve frequencies within the first radio frequency bandwidth.

2. The method of claim 1, further comprising:
   determining a second radio frequency bandwidth for a second radio frequency branch based on the one or more factors associated with the traffic served by the plurality of radio frequency bandwidth parts; and configuring the second radio frequency branch to serve frequencies within the second radio frequency bandwidth.

3. The method of claim 2, wherein the first radio frequency bandwidth and the second radio frequency bandwidth partially overlap.

4. The method of claim 1, wherein a first radio frequency bandwidth part is served by a first number of radio frequency branches and a second radio frequency bandwidth part is served by a second number of radio frequency branches, wherein the first number is different to the second number.

5. The method of claim 1, further comprising allocating the first radio frequency bandwidth to the first radio frequency branch for use in uplink communication.

6. The method of claim 4, wherein the step of determining comprises:
determining the first number based on the one or more factors associated with the first radio frequency bandwidth part; and
selecting the first radio frequency bandwidth for the first radio frequency branch based on the first number.

7. The method of claim 6, wherein the one or more factors comprises whether the first radio frequency bandwidth part is serving a wireless device having at least one radio condition not meeting a predetermined criteria.

8. The method of claim 7, wherein determining the first number comprises, responsive to the first radio frequency bandwidth part serving a wireless device having at least one radio condition not meeting a predetermined criteria, setting the first number as higher than if the first radio frequency bandwidth part was not serving a wireless device at least one radio condition not meeting a predetermined condition.

9. The method of claim 6, wherein the one or more factors comprises whether the first radio frequency bandwidth part is serving a wireless device having a first Guaranteed Bit Rate (GBR) requirement.

10. The method of claim 9, wherein determining the first number comprises, responsive to the first radio frequency bandwidth part serving a wireless device having a first GBR requirement, setting the first number as higher than if the first radio frequency bandwidth part was serving a wireless device having a second GBR requirement higher than the first GBR requirement.

11. The method of claim 1, further comprising:
determining a subset of wireless devices, wherein each wireless device in the subset is sensitive to a number of radio frequency branches serving a radio frequency bandwidth part associated with the wireless device; and
scheduling the subset of wireless devices such that the radio frequency bandwidth parts serving the subset of wireless devices comprise contiguous frequency resources.

12. The method of claim 1, further comprising allocating the first radio frequency bandwidth to a first radio frequency branch for use in uplink communication, and allocating a second radio frequency bandwidth to the first radio frequency branch for use in downlink communication.

13. A scheduler for configuring communication between a base station and at least one wireless device, the base station using an antenna array having a plurality of antenna ports coupled to radio frequency branches; the scheduler comprising processing circuitry and a memory, said memory containing instructions executable by said processing circuitry whereby said scheduler is configured to:
determine a first radio frequency bandwidth for a first radio frequency branch based on one or more factors associated with traffic served by a plurality of radio frequency bandwidth parts within a total bandwidth of the antenna array, and
configure the first radio frequency branch to serve frequencies within the first radio frequency bandwidth.

14. The scheduler of claim 13, further configured to:
determine a second radio frequency bandwidth for a second radio frequency branch based on the one or more factors associated with the traffic served by the plurality of radio frequency bandwidth parts; and
configure the second radio frequency branch to serve frequencies within the second radio frequency bandwidth.

15. The scheduler of claim 13, wherein a first radio frequency bandwidth part is served by a first number of radio frequency branches and a second radio frequency bandwidth part is served by a second number of radio frequency branches, wherein the first number is different to the second number.

16. The scheduler of claim 15, further configured to determine the first radio frequency bandwidth by:
determining the first number based on the one or more factors associated with the first radio frequency bandwidth part; and
selecting the first radio frequency bandwidth for the first radio frequency branch based on the first number.

17. The scheduler of claim 16, wherein the one or more factors comprises whether the first radio frequency bandwidth part is serving a wireless device having at least one radio condition not meeting a predetermined criteria.

18. The scheduler of claim 17, further configured to determine the first number by, responsive to the first radio frequency bandwidth part serving a wireless device having at least one radio condition not meeting a predetermined criteria, setting the first number as higher than if the first radio frequency bandwidth part was not serving a wireless device at least one radio condition not meeting a predetermined condition.

19. The scheduler of claim 16, wherein the one or more factors comprises whether the first radio frequency bandwidth part is serving a wireless device having a first Guaranteed Bit Rate (GBR) requirement.

20. The scheduler of claim 19, further configured to determine the first number by, responsive to the first radio frequency bandwidth part serving a wireless device having a first GBR requirement, setting the first number as higher than if the first radio frequency bandwidth part was serving a wireless device having a second GBR requirement higher than the first GBR requirement.

21. The scheduler of claim 13, further configured to allocate the first radio frequency bandwidth to the first radio frequency branch for use in uplink communication.

22. The scheduler of claim 13, further configured to:
determine a subset of wireless devices, wherein each wireless device in the subset is sensitive to a number of radio frequency branches serving a radio frequency bandwidth part associated with the wireless device; and
schedule the subset of wireless devices such that the radio frequency bandwidth parts serving the subset of wireless devices comprise contiguous frequency resources.

23. The scheduler of claim 13, further configured to allocate the first radio frequency bandwidth to a first radio frequency branch for use in uplink communication, and allocate a second radio frequency bandwidth to the first radio frequency branch for use in downlink communication.

24. A non-transitory computer readable media having stored thereon a computer program comprising instructions which, when executed on at least one processor, cause the at least one processor in a base station to:
   determine a first radio frequency bandwidth for a first radio frequency branch based on one or more factors associated with traffic served by a plurality of radio frequency bandwidth parts within a total bandwidth of the antenna array, and
   configure the first radio frequency branch to serve frequencies within the first radio frequency bandwidth.

* * * * *